Patented Dec. 18, 1934

1,984,886

UNITED STATES PATENT OFFICE 1,984,886

1-AMINO-ARYLENE THIAZOLES AND THEIR PRODUCTION

Herbert August Lubs and John Elton Cole, Wilmington, Del., assignors to E. I. du Pont de Nemours & Company, Wilmington, Del., a corporation of Delaware No Drawing. Application May 6, 1931, Serial No. 535,560

7 Claims. (Cl. 260—44)

This application is a continuation-in-part of our copending application, Serial No. 524,757, filed March 23, 1931.

This invention relates to the manufacture of chlorinated aryl thiazoles. More particularly it relates to the preparation of chlorinated aryl thiazoles having the probable formula

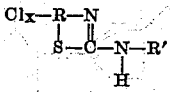

in which R and R' represent aryl radicals which may be alike or different and which may contain substituents, for example, halogen, alkyl and alkoxy, and $x$ represents an integer.

This invention has for an object the economical manufacture of halogenated-aryl-amino-aryl-thiazoles. Other objects are the production of new chemical compounds, of new chemical processes and in general an advancement of the art.

These objects are accomplished by treating compounds having the probable formula

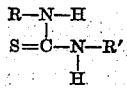

and which have one position of the radical R adjacent the —NH group unsubstituted, or compounds having the probable formula

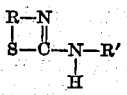

with chlorinating agents.

The invention will be further understood from a consideration of the following specific examples in which the parts are given by weight.

Example I

One hundred (100) parts of 1-ortho-toluidino-3-methyl-benzo-thiazole were suspended in 400 parts of nitro-benzene and 150 parts of sulphuryl chloride added to the well agitated mass. The solution was warmed for a few minutes at 60° C., cooled and filtered. The precipitate was washed with benzene to remove the nitro-benzene. The product consisted of the hydrochloride of 1-para-chloro-ortho-toluido-3-methyl-5-chlor-benzo-thiazole. The free base was obtained from this compound by agitation with excess ammonia.

Example II

Twenty (20) parts of 1-ortho-toluido-3-methyl-benzo-thiazole were suspended in 100 parts of nitro-benzene and chlorine passed in slowly at ordinary temperatures for eight hours (or until a test showed that the desired degree of chlorination had been obtained). The product was then removed by filtration and identified as in Example I.

Example III

Fifty (50) parts of di-ortho-tolyl-thiourea were suspended in 150 parts of commercial ortho-di-chloro-benzene. This mixture was well cooled and chlorine was passed in with good agitation. During the first vigorous reaction the chlorine was passed in at such speed as to keep the temperature of the reactions below 20° C. The thiourea dissolved and after a short time a precipitate began to form. The chlorine was then allowed to pass in slowly for eight hours more at ordinary temperature. The product was then removed by filtration and identified by the melting point of the free base. The compound produced was 1-para-chloro-ortho-toluidino-3-methyl-5-chlor-benzo-thiazole.

Example IV

Three hundred (300) parts of di-ortho-tolyl-thiourea were suspended in 1200 parts of nitro-benzene and chlorine passed in with good agitation and cooling. The thiourea first dissolved and then the product began to precipitate. Chlorine was passed in slowly for eight hours. The yield of the apparently pure hydrochloride of 1-para-chloro-ortho-toluidino-3-methyl-5-chloro-benzo-thiazole was almost equal in weight to the amount of thiourea used as a starting material. This hydrochloride melted with the evolution of a gas at about 265° C.

Example V

One (1) part of thio-carbanilide was suspended in 3 parts of nitro-benzene. Chlorine was passed into the cooled suspension for 10 hours (until a test showed that the product was fully chlorinated). The product was removed by filtration. It was shown to be the hydrochloride of 1-ortho-para-di-chloro-anilido-5-chloro-benzo-thiazole.

Example VI

Chlorine was passed into a cold nitro-benzene suspension of para-chloro-phenyl-phenyl-thio-urea having the probable formula

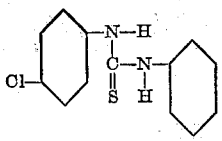

The hydrochloride of the chlorinated product produced was removed by filtration and the product shown to be 1-ortho-para-di-chloro-anilido-benzo-thiazole having the probable formula

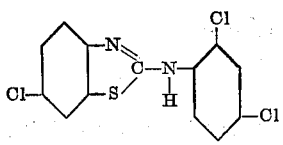

Example VII

The process of Example III was carried out by substituting proportionate quantities of di-anisyl-thiourea having the probable formula

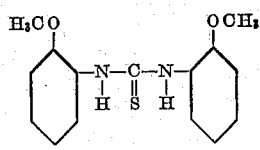

for the di-ortho-tolyl-thiourea therein described. The resultant chlorinated benzo-thiazole having the probable formula

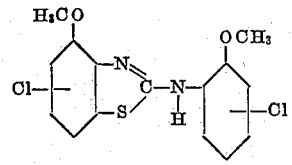

was produced.

As will be clear from the above examples this invention is applicable to a wide range of starting compounds. It is particularly applicable to the preparation of chlorinated aryl-amino-benzo-thiazoles especially those which result from the chlorination of thioureas having the formula

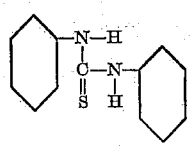

and benzo-thiazoles having the formula

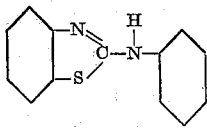

in each of which either or both of the aryl radicals may be substituted. Very desirable results have been obtained in the preparation of the aryl-amino-benzo-thiazoles having the formula

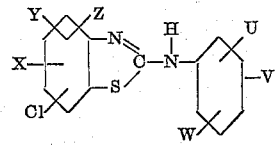

by the chlorination of the thioureas having the fomula

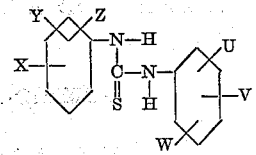

and the benzo-thiazoles having the formula

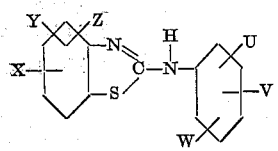

in each of which formulæ, U, V, W, X, Y and Z represent members of the group consisting of hydrogen, alkyl for example, methyl and alkoxy for example, methoxy.

So far as now appears the compound produced in the above examples having the probable formula

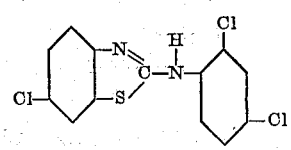

which is a white solid slightly soluble in boiling ethyl alcohol and melting at about 175° C. and the compound having the probable formula

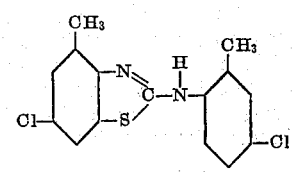

which is a white solid sparingly soluble in boiling ethyl alcohol and melting at about 201.8 to 202.6° C. have never before been produced.

It is not intended that the invention be limited to the use of chlorine as a chlorinating agent since compounds producing similar effects may be used as sources of available chlorine. Where desired a chlorination catalyst such as iron, iodine and the like may be used.

A wide range of suspension agents may be used for example, nitro-benzene, nitro-toluene, acetic acid, ethylene di-chloride, sulphur dioxide and chloro-benzenes. Other solvents and/or suspension agents will be obvious to those skilled in the art. In certain instances it is possible to eliminate the use of a suspension agent or solvent by using an excess of the chlorinating agent. Since some of the starting compounds exhibit some solubility in some of the suspension media, it is intended that the term "suspension" as used in the specification and claims, be generic to, and cover the mixture of starting compound and the suspension medium whether a solution exists or not. When it is intended to cover either type of suspension medium to the exclusion of the other, its full description is included.

Pressure may be used to an advantage in the invention above described since it increases the solubility of the reacting gases in the solvents or suspension agents selected.

In the above description use has been made of the formula of the type

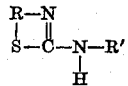

but it is realized that these compounds may exist in the tautomeric form having the formula

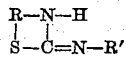

and for this reason, wherever the first mentioned formula is used in the specification and claims it is intended that it cover the compound regardless of the tautomeric form in which it actually exists.

In regard to the theory underlying the present invention there are apparently two or more distinct reactions which occur. First, the thiourea is converted to the unchlorinated aryl thiazole then in the presence of an additional amount of chlorinating agent the aryl nucleus is chlorinated. Sometimes these two reactions are entirely distinct but usually they proceed simultaneously. From the standpoint of economy it is not preferable to use the aryl thiazole as a starting compound.

The compounds above described are valuable as intermediates in the manufacture of dyestuffs.

As many apparently widely different embodiments of this invention may be made without departing from the spirit and scope thereof, it is to be understood that we do not limit ourselves to the specific embodiments thereof except as defined in the appended claims.

We claim:

1. The compound 1-ortho-para-di-chloro-anilido-5-chloro-benzothiazole having the formula

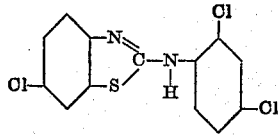

which is a white solid slightly soluble in boiling ethyl alcohol and melting at about 175° C.

2. The process of preparing 1-ortho-para-di-chloro-phenyl-5-chloro-amino-benzothiazole which comprises chlorinating a suspension of thio-carbanilide.

3. The process of preparing 1-para-chloro-ortho-toluidino-3-methyl-5-chloro-benzothiazole which comprises chlorinating a suspension of di-ortho-tolyl-thiourea.

4. The process which comprises treating a suspension of a compound having the formula R—NH—CS—NH—R', wherein R and R' are aryl radicals of the benzene or naphthalene series which may be alike or different, and of which at least one has one position adjacent to the —NH group unsubstituted, with a chlorinating agent until a nuclearly chlorinated aryl thiazole has been produced.

5. The process which comprises treating a compound having the formula R—NH—CS—NH—R', wherein R and R' are aryl radicals of the benzene series which may be alike or different, and of which at least one has one position adjacent to the —NH group unsubstituted, with a chlorinating agent until a nuclearly chlorinated benzothiazole has been produced.

6. The process which comprises treating a suspension of a compound having the formula R—NH—CS—NH—R', wherein R and R' are phenyl or naphthyl radicals which may be alike or different, and in which at least one of the radicals R and R' has one position adjacent to the —NH groups unsubstituted, with a chlorinating agent at a temperature not above 20° C. until a nuclearly chlorinated aryl-thiazole has been produced.

7. The process of producing a nuclearly chlorinated aryl-thiazole compound, which comprises suspending a diphenyl-thiourea of the group consisting of diphenyl-thiourea, homologs thereof, halogen substitution products thereof and alkoxy derivatives thereof but in which at least one of the phenyl groups has one free position ortho to the —NH group, in an inert organic liquid suspending medium, passing in chlorine gas at a temperature not above 20° C., continuing the reaction until chlorine is no longer absorbed, and recovering the precipitated product.

HERBERT A. LUBS.
JOHN ELTON COLE.